United States Patent [19]

Nomura et al.

[11] Patent Number: 4,694,734
[45] Date of Patent: Sep. 22, 1987

[54] SEALING CONSTRUCTION FOR SLIDE TYPE VACUUM PUMP WITH FINGER PORTIONS OF SPRING ELEMENT PRESSING CYLINDRICAL PORTION OF SEAL ELEMENT AGAINST CYLINDER BORE

[75] Inventors: Yoshihisa Nomura, Toyota; Koichi Suda; Tadashi Kozawa, both of Oobu, all of Japan

[73] Assignees: Toyota Jidosha Kabushiki Kaisha; Aisan Kogyo Kabushiki Kaisha, both of Japan

[21] Appl. No.: 892,282

[22] Filed: Aug. 4, 1986

[30] Foreign Application Priority Data

Aug. 9, 1985 [JP] Japan ................. 60-176493

[51] Int. Cl.[4] ................................................ F16J 9/06
[52] U.S. Cl. ................................. 92/130 R; 92/249; 92/194; 277/139
[58] Field of Search ............. 92/249, 193, 194, 130 R; 277/139; 417/450

[56] References Cited

U.S. PATENT DOCUMENTS

| 559,589 | 5/1896 | Miehle | 417/550 X |
| 847,785 | 3/1957 | Kleinberg | 417/550 X |
| 1,390,680 | 9/1921 | Drew | 417/550 |
| 2,106,829 | 2/1938 | Christenson | 92/249 |
| 3,295,419 | 1/1967 | Vielmo | 92/249 X |
| 4,541,640 | 9/1985 | Tregonning | 277/152 |

Primary Examiner—Alan Cohan
Attorney, Agent, or Firm—Parkhurst & Oliff

[57] ABSTRACT

A slide type vacuum pump has a cylinder bore with a cylindrical piston reciprocatingly slidably fitted therein and defining a vacuum pumping chamber. A seal element is housed in an annular groove around the piston defined by a radially extending annular surface and an axially extending cylindrical surface. The seal element includes an inwardly radially extending annular portion axially abutted against the annular groove defining surface and an axially extending cylindrical portion slidingly sealing against the cylinder bore. A first spring member has an inwardly radially extending annular portion axially abuttingly holding the annular seal element portion against the annular groove defining surface, and several axially extending resilient finger portions each angled outwards somewhat and springingly pressing the cylindrical seal element portion radially outwards against the cylinder bore to effect sealing therebetween. The outer peripheral portion of a second disk shaped spring member resiliently axially presses the first spring member annular portion and the annular seal element portion against the annular groove defining surface.

6 Claims, 4 Drawing Figures

SEALING CONSTRUCTION FOR SLIDE TYPE VACUUM PUMP WITH FINGER PORTIONS OF SPRING ELEMENT PRESSING CYLINDRICAL PORTION OF SEAL ELEMENT AGAINST CYLINDER BORE

BACKGROUND OF THE INVENTION

The present invention relates to a slide type vacuum pump, and more particularly relates to an improved sealing construction for such a slide type vacuum pump, said pump being for example suitable for being utilized for providing vacuum for a brake booster of an automotive vehicle, which has an improved sealing effect so as to prolong pump life and improve pump efficiency.

The present invention has been described in Japanese patent application Ser. No. Showa 60-176493 (1985), filed by an applicant the same as the entity assigned or owed duty of assignment of the present patent application; and the present patent application hereby incorporates into itself by reference the text of said Japanese Patent Application and the claim and the drawings thereof; a copy is appended to the present application.

There are per se known types of slide type vacuum pumps, such as for example are utilized for providing vacuum for a brake booster of an automotive vehicle. Such a slide type vacuum pump typically has a housing formed with a cylinder bore, with a generally cylindrical piston member being reciprocatingly slidably fitted in said cylinder bore, thus defining a vacuum pumping chamber on one side of said piston member. Typically, to the vacuum pumping chamber there are communicated two check valves, one of which is connected in the orientation appropriate so as to allow air to flow from said vacuum pumping chamber to the outside ambient atmosphere but not in the reverse direction, and the other of which is connected in the opposite orientation so as to allow air to flow from a device which is to be exhausted of air (such as a brake booster of an automobile) into said vacuum pumping chamber but not in the reverse direction. And a mechanical linkage, such as a rocker arm rocked to and fro by resting against an eccentric cam formed on a cam shaft, reciprocatingly slides said piston to and fro in said cylinder bore, so as alternately to increase and diminish the volume of said vacuum pumping chamber so that outward pumping action of air for said device to be exhausted of air is thereby performed.

With a slide type vacuum pump of this configuration, it is very important to provide a good sealing effect between the outer peripheral cylindrical surface of the piston member and the inner cylindrical surface of the cylinder bore, so as to ensure good and durable pumping action. Thus, it is quite typical to provide a seal element such as a seal ring or piston band or the like around said outer peripheral cylindrical surface of said piston member. Such a construction is, for example, disclosed in Japanese Patent Laying Open Publication Ser. No. 59-206685 (1984).

Typically, such a seal element is housed in a circumferential groove provided around the piston member. However, a still unsolved problem of such a construction relates to abrasion wear and deterioration of the seal element. If the seal element becomes worn or deteriorated by heat or the like, the sealing performance provided by said seal element against the cylinder bore may become deteriorated, and this can lead to air leakage and deterioration of vacuum pumping function. Further, there is a possibility that the good sealing of the seal element against the piston, i.e. against the side and bottom of the circumferential groove around the piston in which the seal element is housingly received, should become deteriorated, especially over a long pump service lifetime. Such a problem can also lead to air leakage and deterioration of vacuum pumping function.

SUMMARY OF THE INVENTION

Accordingly, it is the primary object of the present invention to provide a sealing construction for a slide type vacuum pump, which is improved so as to overcome the problems detailed above.

It is a further object of the present invention to provide such a sealing construction for a slide type vacuum pump, which maintains good vacuum pumping performance of the pump, even over a long service life.

It is a further object of the present invention to provide such a sealing construction for a slide type vacuum pump, which maintains good vacuum pumping performance of the pump, even if the pump is subjected to relatively high temperature.

It is a yet further object of the present invention to provide such a sealing construction for a slide type vacuum.

It is a yet further object of the present invention to provide such a sealing construction for a slide type vacuum pump, incorporating a seal element fitted around a piston of said pump which slides in a cylinder bore thereof, which assures of good and lasting sealing performance between said seal element and said cylinder bore.

It is a yet further object of the present invention to provide such a sealing construction for a slide type vacuum pump, incorporating a seal element fitted around a piston of said pump which slides in a cylinder bore thereof, which further assures of good and lasting sealing performance between said seal element and said piston.

It is a yet further object of the present invention to provide such a sealing construction for a slide type vacuum pump which has good assemblabilty.

According to the most general aspect of the present invention, these and other objects are attained by, for a slide type vacuum pump, comprising: (a) a cylinder bore; and: (b) a generally cylindrical piston member reciprocatingly slidably fitted in said cylinder bore; (c) with a vacuum pumping chamber being defined on a one side of said piston member: a sealing construction, comprising: (d) a seal element housed in an annular groove shape formed around an axial end remote from said vacuum pumping chamber of said generally cylindrical piston member, said annular groove shape being defined by a generally flat annular first surface extending generally radially to said piston member and a generally cylindrical second surface extending generally axially to said piston member, said seal element comprising: (d1) a generally flat annular first portion extending generally radially to said piston member, and axially abutted against said generally flat annular first defining surface of said annular groove shape; and: (d2) a generally cylindrical second portion extending from the outer peripheral portion of said generally flat annular first portion of said seal element generally axially to said piston member in the same axial direction thereof as said generally cylindrical second defining surface of said annular groove shape and away from said vacuum pumping chamber, the outer cylindrical surface of said generally cylindrical second portion sliding against the inner cylindrical surface of said cylinder bore and sealing thereagainst; (e) a first spring member, comprising: (e1) a generally flat annular first portion extending generally radially to said piston member, and axially abutted against said generally flat annular first portion of said seal element and holding it against said generally flat annular member generally axially to said piston member in the same axial direction thereof as said generally cylindrical second portion of said seal element and angled outwards somewhat when said first spring member is in the unstressed condition, and each said resilient finger portion springingly pressing against a portion of the inner cylindrical surface of said generally cylindrical second portion of said seal element and pressing said generally cylindrical second portion of said seal element in the radially outward direction against the inner cylindrical surface of said cylinder bore to effect sealing therebetween; and: (f) a second generally disk shaped spring member the outer peripheral portion of which resiliently presses in the axial direction on said generally flat annular first portion of said first spring member and axially biasing it against said generally flat annular first portion of said seal element and holding the two of them against said generally flat annular first defining surface of said annular groove shape.

In this sealing construction, because the generally cylindrical second portion of said seal element is pressed by said resilient finger portions of said first spring member in the radially outward direction against the inner cylindrical surface of said cylinder bore, thereby good reliable and lasting sealing is positively and definitely effected between said seal element and said cylinder bore. Further, because the outer peripheral portion of said second generally disk shaped spring member presses in the axial direction on said generally flat annular first portion of said first spring member and axially biases it against said generally flat annular first portion of said seal element and holds the two of them against said generally flat annular first defining surface of said annular groove shape formed in said piston, thereby a good sealing effect is also positively and definitely assured between said seal element and said piston. Accordingly, even if the seal element becomes somewhat worn over a long service life, sealing performance is not unduly deteriorated, and the air tightness of the vacuum pumping chamber is assured. Thus, pump performance may be maintained over a prolonged service life.

Further, according to a particular specialization of the present invention, the above specified and other objects are more particularly attained by a sealing construction for a slide type vacuum pump as specified above, further comprising an annular washer interposed between said outer peripheral portion of said second disk shaped spring member and said generally flat annular first portion of said first spring member. This washer makes the contact between said second disk shaped spring member and said first spring member more smooth, and appropriately cushions any scraping that might otherwise occur therebetween. Also, according to another possible particular specialization of the present invention, said second disk shaped spring member may be coupled by its central portion to said piston member at least with regard to mutual movement between them in the axial direction, and this may be done either by said vacuum pump further comprising an actuating rod fitted to the central portion of said piston member and protruding therefrom, wherein said central portion of said second disk shaped spring member is clamped between said piston member and a portion of said actuating rod, or by said central portion of said piston member being formed with a tubular shaped portion protruding therefrom, wherein said central portion of said second disk shaped spring member is slidably mounted over said tubular shaped portion of said piston member and is springingly biased therealong towards said piston member. Either of these constructions will be appropriate, depending upon circumstances. Further, said second disk shaped spring member may further serve for seating a spring which axially biases said piston member for aiding with vacuum pumping action of said slide type vacuum pump. This construction can be most convenient.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

Figure 1:
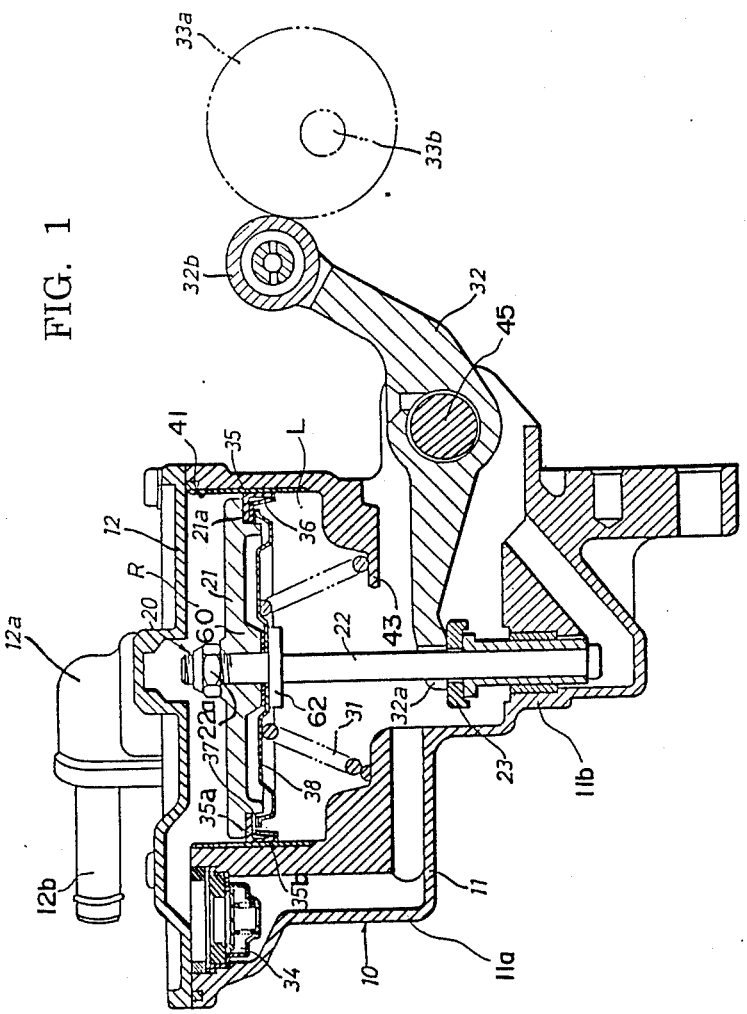
FIG. 1 is a sectional view taken through a slide type vacuum pump incorporating the first preferred embodiment of the sealing construction of the present invention, the sectional plane of said figure including the central axis of a piston and a rod included in said slide type vacuum pump.

The present invention will now be described with reference to the preferred embodiments thereof, and with reference to the figures. A slide type vacuum pump incorporating the first preferred embodiment of the sealing construction of the present invention is generally shown in sectional view in FIG. 1: this pump has a housing generally denoted by the reference numeral 10, and in fact the intended application of this slide type vacuum pump is that this housing 10 should be fixed by screws onto a cylinder head cover of a cylinder head of an internal combustion engine of an automotive vehicle, although such arrangements are not shown in the figures and are only adumbrated herein.

The housing 10 is formed from a lower housing 11 and an upper housing 12. The lower housing 11 is formed with a main generally hollow cylindrical shape 11a and a lower portion which incorporates a boss portion 11b, and a cylindrical piston assembly 20 is mounted within said generally hollow cylindrical shape 11a and slides reciprocatingly therein. And the upper housing 12 is generally formed as a lid which closes the top of said generally hollow cylindrical shape 11a of said lower housing 11, as will be described hereinafter.

The piston assembly 20 comprises a disk shaped piston member 21 and a rod member 22. This rod member 22 is mounted to the central point of the piston member 21, which is fattened up to constitute a boss portion 60 as will be discussed hereinafter, and extends at right angles therefrom, being secured to said piston member 21 by a nut 22a. The piston member 21 is slidably mounted inside the generally hollow cylindrical shape 11a of the lower housing 11 with the external cylindrical surface of said piston member 21 sliding on the internal cylindrical surface of said lower housing 11 and sealingly fitted thereto by the first preferred embodiment of the sealing construction of the present invention, to be described hereinafter, and the lower end portion in the figure of the rod member 22 is slidably mounted in a hole formed in the boss portion 11b of said lower housing 11. Thereby, the piston assembly 20 as a whole is slidably mounted inside the housing 10 of the slide type vacuum pump, and, within said housing 10, a lower chamber L is defined below (from the point of view of the figure) the piston member 21 of said piston assembly 20, while an upper chamber R is similarly defined above said piston member 21. A compression coil spring 31 is mounted within said lower chamber R, around the rod member 22 of the piston assembly 20, so as to bias said piston assembly 20 upwards as seen in the figure, and so as to increase the volume of said lower chamber R while decreasing the volume of said upper chamber L: the lower end in the figure of this compression coil spring 31 presses against a circumferential inner step portion 43 formed at the lower end of the hollow cylindrical shape 11a of the lower housing 11, while the upper end in the figure of said compression coil spring 31 presses against a disk spring member 38 which will be described hereinafter, which is coupled to the piston assembly 20, at least with regard to mutual movement thereof in the longitudinal direction.

On a centrally lower portion of the rod member 22 of the piston assembly 20 there is fixedly mounted a thrust washer member 23. A rocker arm member 32 is pivotally mounted in the housing 10 of this slide type vacuum pump by a pivot pin 45, and two arm portions of a fork shaped end portion 32a of an inner end of said rocker arm member 32 are fitted around the rod member 22, above the thrust washer member 23 and between it and the piston member 21, while a roller end portion 32b of the other outer end of said rocker arm member 32 is, when this slide type vacuum pump is as suggested above fixed onto the cylinder head cover of the cylinder head of the internal combustion engine not shown in the figure, pressed against an eccentric cam portion 33a formed on a rotating overhead cam shaft 33b of said internal combustion engine.

The upper chamber R, which as will be seen shortly is a vacuum chamber, is defined between the upper surface in the figure of the piston member 21, the hollow cylindrical shape 11a of the lower housing 11, and the upper housing 12. This vacuum chamber R is intermittently communicated to the ambient external atmosphere via a per se known breathing check valve 34, which is fitted through the lower housing 11 and allows flow of gas through itself only in the direction from inside the vacuum chamber R to the outside external atmosphere but not in the other direction. Further, this vacuum chamber R is communicated via a vacuum take out pipe 12b to a brake booster for the automotive vehicle to which this slide type vacuum pump is fitted, via another check valve not particularly shown in the figures fitted in a chamber 12a provided to the upper side of the upper housing 12; this not depicted check valve allows flow of gas through itself only in the direction from outside through the vacuum take out pipe 12b inward into the vacuum chamber R, but not in the other direction.

Thus, during operation of the internal combustion engine and as the cam shaft 33b of said engine rotates, the roller end portion 32b at the outer end of the rocker arm member 32 is pushed to and fro (approximately sideways in FIG. 1) by the eccentric cam portion 33a formed on said cam shaft 33b, and this causes said rocker arm member 32 to be rocked to and fro about the pivot shaft 45 therefor, which in turn causes the fork shaped end portion 32a on the other inner end of said rocker arm member 32 to be alternatingly moved upwards and downwards as seen in the figure, thus alternatingly respectively allowing the piston assembly 20 to be biased upwards by the biasing force of the the compression coil spring 31 so as to diminish the volume of the vacuum chamber R, and pushing downwards against the thrust washer member 23 so as to force said piston assembly 20 in the downwards direction against the biasing force of the the compression coil spring 31 which is overcome, so as to increase the volume of the vacuum chamber R. When the volume of said vacuum chamber R is thus decreased, air in said vacuum chamber R is expelled therefrom through the breathing check valve 34 to the atmosphere while on the other hand being prevented from passing through the vacuum take out pipe 12b to the not shown brake booster by the valve action of the the other check valve, also not shown, fitted in the chamber 12a. On the other hand, when the volume of said vacuum chamber R is thus increased, air in the not shown brake booster is sucked therefrom into said vacuum chamber R through the vacuum take out pipe 12b past said other not shown check valve fitted in the chamber 12a, while on the other hand air is not allowed to be sucked in from the atmosphere into said vacuum chamber R due to the valve action of the breathing check valve 34. Thereby, as a whole, when the cam shaft 33a is rotated by the operation of the internal combustion engine, the piston assembly 20 is reciprocated up and down as seen in the figure, and the volume of the vacuum chamber R is alternatingly increased and decreased, thus providing a pumping action which sucks air from inside the not shown brake booster and expels said air to the external ambient atmosphere.

Now, the first preferred embodiment of the sealing construction of the present invention, which sealingly and slidingly fits the outer peripheral cylindrical surface of the piston member 21 against the inner cylindrical surface of the generally hollow cylindrical shape 11a of the lower housing 11, will be described; for this, a description of the peripheral edge portion of said piston member 21 is required.

Figure 2:
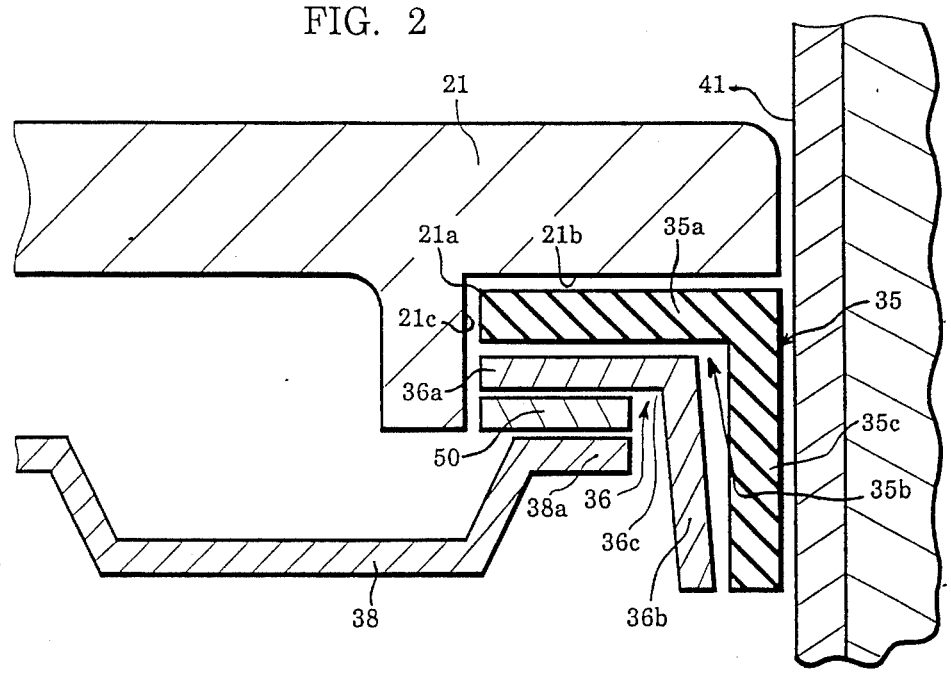
FIG. 2 is an enlarged sectional view showing one side of said first preferred embodiment sealing construction.

In detail, referring to the enlarged and partial sectional view of FIG. 2, the piston member 21, while in its overall shape being formed as a disk like or short cylindrical member, further has an annular peripheral notch shape 21a formed around its periphery, said annular peripheral notch shape 21a being defined by a cylindrical surface 21c whose generators extend in the longitudinal direction of said piston member 21 and by a flat annular surface 21b whose generators extend in the radial direction of said piston member 21. And an annular seal element generally denoted as 35 is formed as comprising a cylindrical portion 35b whose generators extend in the longitudinal direction of said piston member 21 and an inwardly extending flat annular flange portion 35a whose generators extend in the radial direction of the piston member 21. This annular seal element 35 is seated in the aforementioned notch shape 21a of the piston member 21 with its flat annular flange portion 35a abutting against the aforesaid flat annular surface 21b of said piston member 21, and with its cylindrical portion 35b extending in the opposite direction to the main portion of said piston member 21, i.e. away from the cylindrical surface 21c of said piston member 21 and parallel to, but outside, the defining cylindrical surface 21c of the notch 21a. Thus, an inwardly facing inner groove or channel shape 35c is defined on the inner side of said annular seal element 35, the defining surfaces thereof being the inner cylindrical surface of said cylindrical portion 35b of said seal element 35 and by the downwardly facing surface in the figure of said flat annular flange portion 35a thereof. The annular seal element 35 may be formed of a material such as resin.

Figure 3:
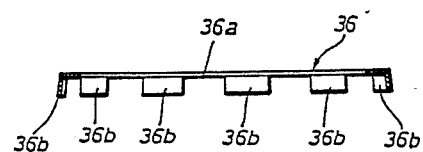
FIG. 3 is a side view of a finger washer included in said first preferred embodiment sealing construction.

Further, in this groove shape 35c of the annular seal element 35 there is fitted the finger spring 36, which is shown in side view in FIG. 3. This finger spring 36 comprises a flat disk shaped annular main portion 36a formed generally as a ring, and a plurality of relatively small and somewhat springy integrally formed finger portions 36b, each of which extends from the outer peripheral edge of said annular main portion 36a generally in the longitudinal direction of the central axis of said annular main portion 36a, but somewhat angling outwards from said longitudinal direction, as clearly visible in FIG. 3. This finger spring 36 is fitted in the inwardly facing groove shape 35c of the annular seal element 35 as shown in FIG. 2, with its annular main portion 36a resting and abutting against the flange portion 35a of said annular seal element 35, thereby pressing said flange portion 35a against the aforesaid flat annular surface 21b of the piston member 21. In this position, the finger portions 36b by their resilient action press the cylindrical portion 35b of the annular seal element 35 outwards in the radial direction, so as to press said cylindrical portion 35b against the inner hollow cylindrical shape 11a of the lower housing 11 and so as to ensure a good and airtight seal therebetween. And this finger spring 36 is held in said inwardly facing groove shape 35c of the annular seal element 35 by a disk spring 38, with the interposition of an annular flat washer 50 therebetween. In more detail, the disk spring 38, which is shaped generally as a disk but is somewhat wavy in the radial direction so as to avoid and conform to various structures of the under side of the piston member 21 as shown in FIG. 1, is held at its central portion by the rod member 22 and said piston member 21, by being sandwiched between the aforementioned boss portion 60 of said piston member 21 and a flange portion 62 integrally formed on said rod member 22; thereby, said disk spring 38 is fixed to said members at least with regard to relative movement therebetween in the longitudinal direction (although in fact said disk spring 38 might be allowed to rotate without engendering any problems). And in this position the outer rim of said disk spring 38 is elastically pressed against and biased upwards the annular flat washer 50, thus in turn pressing said annular flat washer 50 against the annular main portion 36a of the finger spring 36, thereby pressing said finger spring 36 annular main portion 36a and the flange portion 35a of the annular seal element 35 against the flat annular surface 21b of the piston member 21. And this disk spring 38, by virtue of its waviness in the radial direction thereof, further serves the purpose of acting as a retainer for the upper end of the compression coil spring 31.

According to this first preferred embodiment type configuration for the sealing construction for this slide type vacuum pump, because by their resilient action the finger portions 36b of the finger spring 36 press the cylindrical portion 35b of the annular seal element 35 outwards in the radial direction against the inner hollow cylindrical shape 11a of the lower housing 11, a definitely good and airtight seal is ensured between said annular seal element 35 and said inner hollow cylindrical shape 11a of said lower housing 11, and thereby, even if said annular seal element 35 becomes damaged or abraded during use, the sealing effect provided by said annular seal element 35 against the hollow cylindrical shape 11a is not deteriorated, and airtightness of the vacuum pumping chamber R is assured, and it is prohibited that air should leak between said annular seal element 35 and said hollow cylindrical shape 11a to deteriorate the vacuum which is being pumped up in the vacuum chamber R. Further, since the outer rim of the disk spring 38 presses against the annular flat washer 50 and presses said washer 50 upwards against the annular main portion 36a of the finger spring 36, thus to press said annular main portion 36a and the flange portion 35a of the annular seal element 35 upwards against the flat annular surface 21b of the piston member 21, thereby further air is prohibited from leaking into said vacuum pumping chamber R from the lower chamber L through a gap which might open up between said annular seal element 35 flange portion 35a and the flat annular surface 21b of the piston member 21: on the contrary, the existence or even transitory opening up of any such gap is positively prohibited, even if fluctuations occur in the pressure of the partial vacuum in the vacuum chamber R, and even if considerable sliding resistance should occur between the sealing cylindrical portion 35a of the annular seal element 35 and the hollow cylindrical shape 11a.

Thus, according to this first preferred embodiment of the sealing construction of the present invention, the air tightness of the vacuum pumping chamber R is assured, and good pump performance is guaranteed even over a long service life. Moreover, since the disk spring 38 is fixed to the piston member 21 and the rod member 22 by being sandwiched between the boss portion 60 and the flange portion 62, and itself supports the finger spring 36 and the seal element 35, and further does double service as a seat or retainer for the upper end of the compression coil spring 31, thereby the support structure for these elements, the finger spring 36 and the seal element 35, does not become unduly complicated.

Moreover, a synthetic resin material, which may be little influenced by heat, may be used for constructing the seal element 35.

THE SECOND PREFERRED EMBODIMENT

Figure 4:
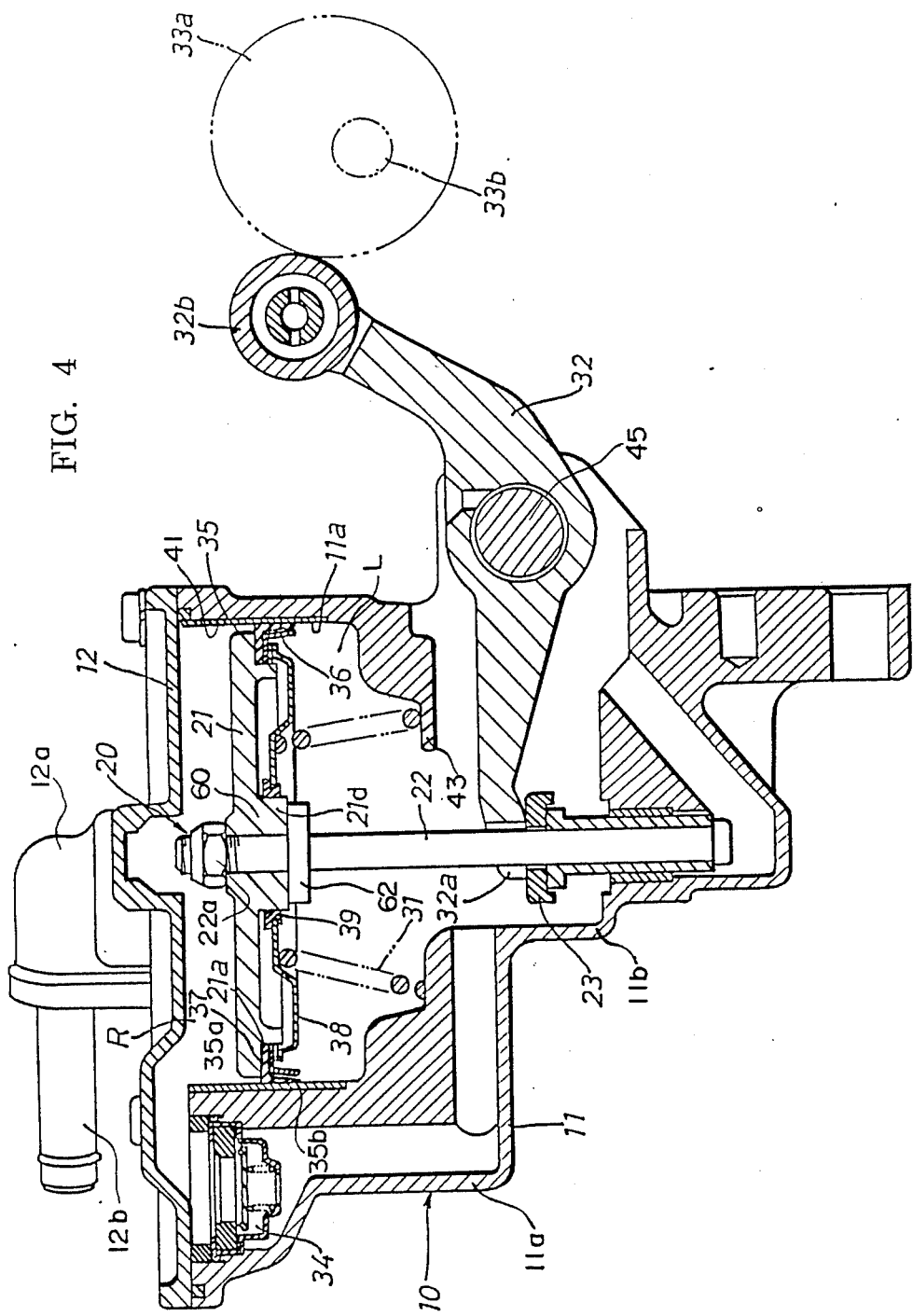
FIG. 4, similarly to FIG. 1 for the first preferred embodiment, is a sectional view taken, in a similar sectional plane, through a slide type vacuum pump incorporating the second preferred embodiment of the sealing construction of the present invention.

The second preferred embodiment of the sealing construction of the present invention is shown in FIG. 4, in a similar manner to FIG. 1 relating to the first preferred embodiment; and, in FIG. 4, like reference numerals to those in FIGS. 1 through 3 denote like parts. In this second preferred embodiment of the sealing construction of the present invention, the only substantial difference relates to the manner in which the central portion of the disk spring 38 is secured to the piston member 21 and to the rod member 22. In detail, the central portion of the piston member 21 is formed as a protruding tubular member 21b, and a guide member 39 is slidably fitted over this tubular member 21b, with an inner rim portion of the disk spring 38 defined around a hole formed in the center thereof being fitted into a circumferential groove formed around said guide member 39 (with the possible use of a circlip construction or the like not shown), so that the disk spring 38 is, in summary, slidably mounted with relation to the piston member 21. Since the biasing force of the compression coil spring 31 biases the disk spring 38 upwards in the figure, substantially at all times said disk spring 38 is kept pressed against the lower surface of the piston member 21, and thereby substantially the same constructional effect is obtained as was the case with the first preferred embodiment described above. Moreover, this second preferred embodiment may have an advantage as regards easy assemblability, over said first preferred embodiment.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. For example, although in the above disclosed preferred embodiments the sealing construction included an intermediate washer 50, in other embodiments it would be possible for said sealing construction to be made while omitting said intermediate washer 50. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a slide type vacuum pump, comprising:
   (a) a cylinder bore; and: (b)
   a generally cylindrical piston member reciprocatingly slidably fitted in said cylinder bore;
   (c) with a vacuum pumping chamber being defined on a one side of said piston member:
   a sealing construction, comprising:
   (d) a seal element housed in an annular groove shape formed around an axial end remote from said vacuum pumping chamber of said generally cylindrical piston member, said annular groove shape being defined by a generally flat annular first surface extending generally radially to said piston member and a generally cylindrical second surface extending generally axially to said piston member, said seal element comprising:
   (d1) a generally flat annular first portion extending generally radially to said piston member, and axially abutted against said generally flat annular first defining surface of said annular groove shape; and:
   (d2) a generally cylindrical second portion extending from the outer peripheral portion of said generally flat annular first portion of said seal element generally axially to said piston member in the same axial direction thereof as said generally cylindrical second defining surface of said annular groove shape and away from said vacuum pumping chamber, the outer cylindrical surface of said generally cylindrical second portion sliding against the inner cylindrical surface of said cylinder bore and sealing thereagainst;
   (e) a first spring member, comprising:
   (e1) a generally flat annular first portion extending generally radially to said piston member, and axially abutted against said generally flat annular first portion of said seal element and holding it against said generally flat annular first defining surface of said annular groove shape; and:
   (e2) a plurality of resilient finger portions, each extending from the outer peripheral portion of said generally flat annular first portion of said first spring member generally axially to said piston member in the same axial direction thereof as said generally cylindrical second portion of said seal element and angled outwards somewhat when said first spring member is in the unstressed condition, and each said resilient finger portion springingly pressing against a portion of the inner cylindrical surface of said generally cylindrical second portion of said seal element and pressing said generally cylindrical second portion of said seal element in the radially outward direction against the inner cylindrical surface of said cylinder bore to effect sealing therebetween;

and:
   (f) a second generally disk shaped spring member the outer peripheral portion of which resiliently presses in the axial direction on said generally flat annular first portion of said first spring member and axially biasing it against said generally flat annular first portion of said seal element and holding the two of them against said generally flat annular first defining surface of said annular groove shape.

2. A sealing construction for a slide type vacuum pump according to claim 1, further comprising an annular washer interposed between said outer peripheral portion of said second disk shaped spring member and said generally flat annular first portion of said first spring member.

3. A sealing construction for a slide type vacuum pump according to claim 1, wherein said second disk shaped spring member is coupled by its central portion to said piston member at least with regard to mutual movement between them in the axial direction.

4. A sealing construction for a slide type vacuum pump according to claim 3, said vacuum pump further comprising an actuating rod fitted to the central portion of said piston member and protruding therefrom, wherein said central portion of said second disk shaped spring member is clamped between said piston member and a portion of said actuating rod.

5. A sealing construction for a slide type vacuum pump according to claim 3, said central portion of said piston member being formed with a tubular shaped portion protruding therefrom, wherein said central portion of said second disk shaped spring member is slidably mounted over said tubular shaped portion of said piston member and is springingly biased therealong towards said piston member.

6. A sealing construction for a slide type vacuum pump according to claim 1, said second disk shaped spring member further serving for seating a spring which axially biases said piston member for aiding with vacuum pumping action of said slide type vacuum pump.

* * * * *